No. 787,169. Patented April 11, 1905.

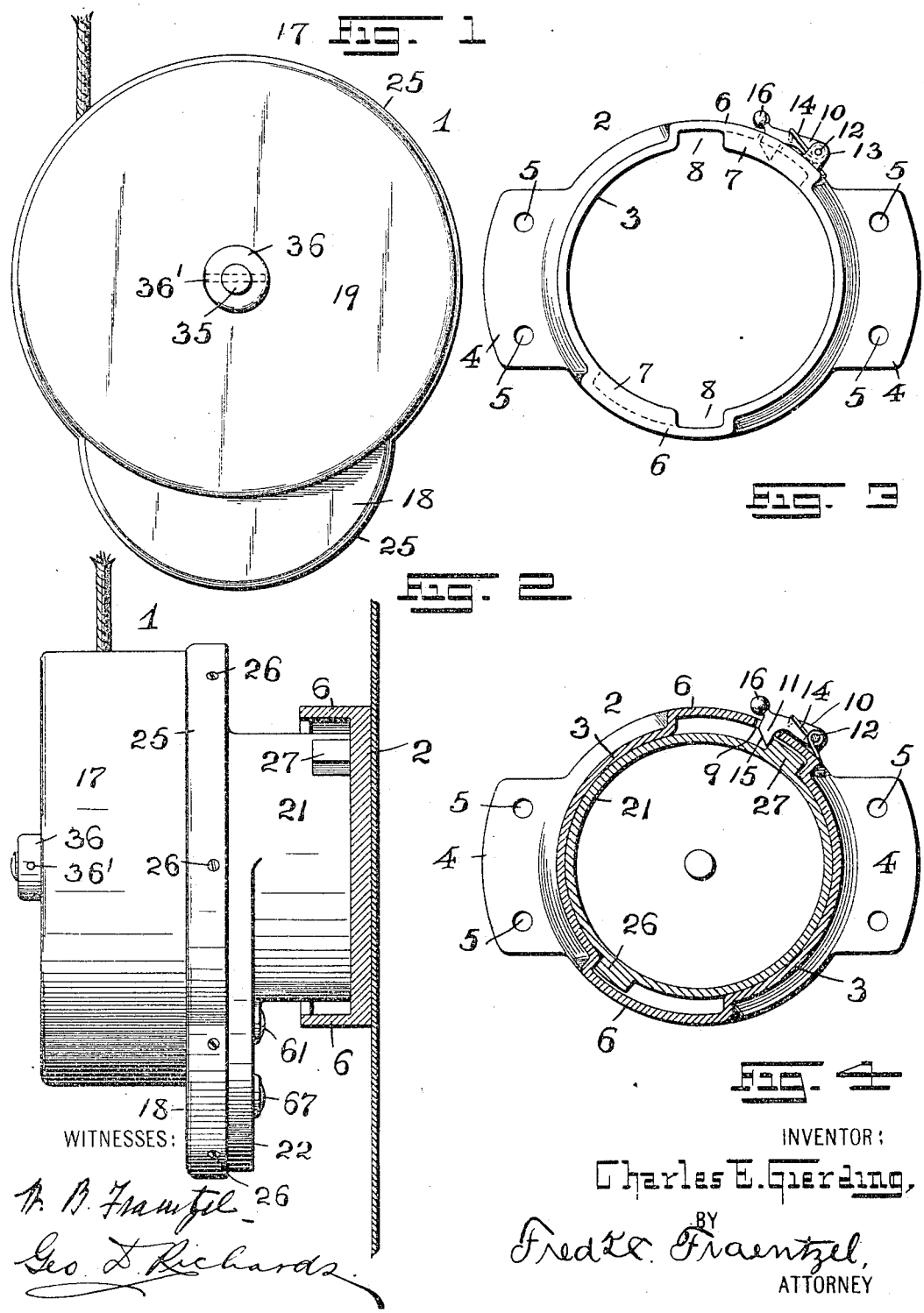

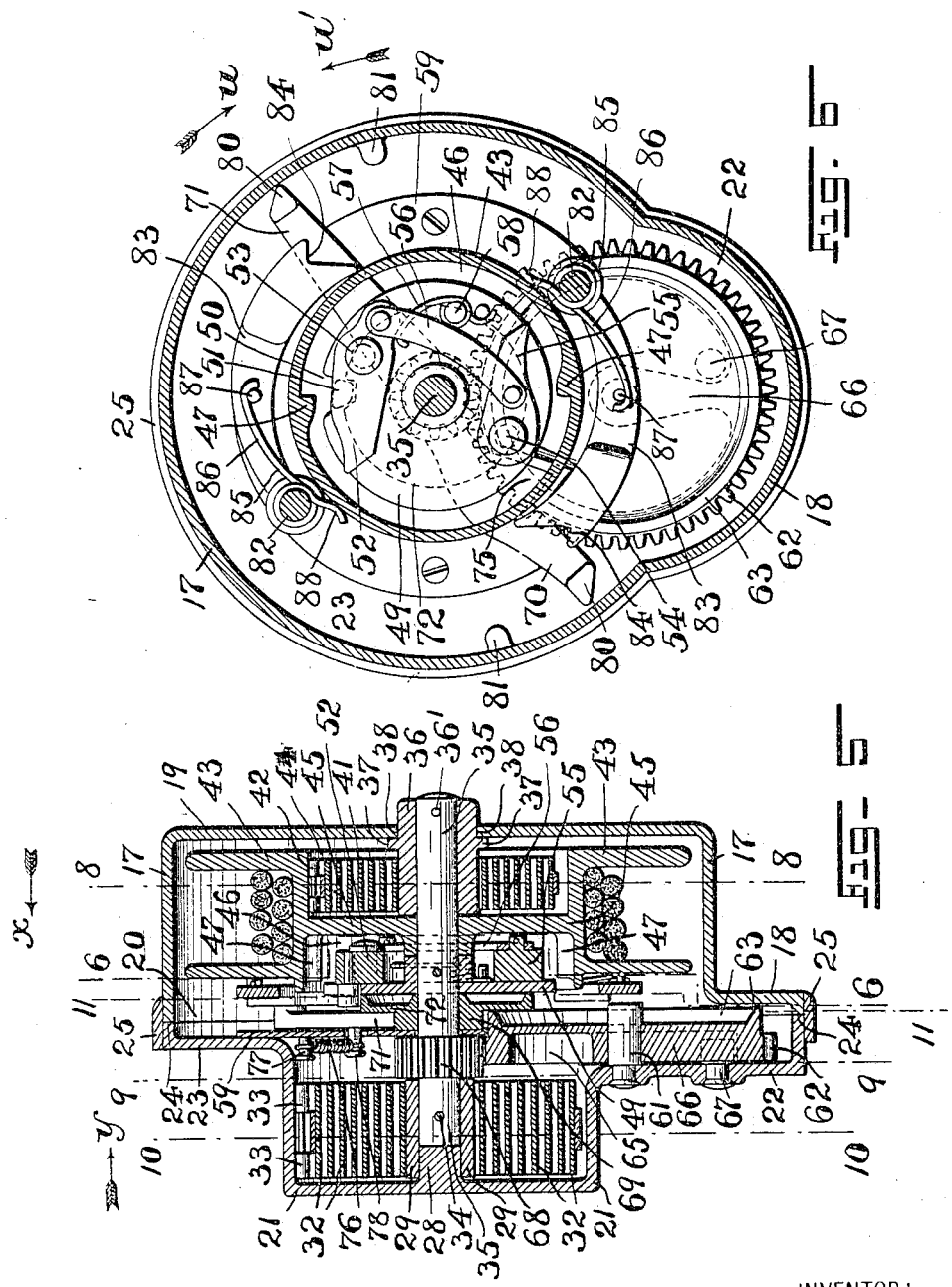

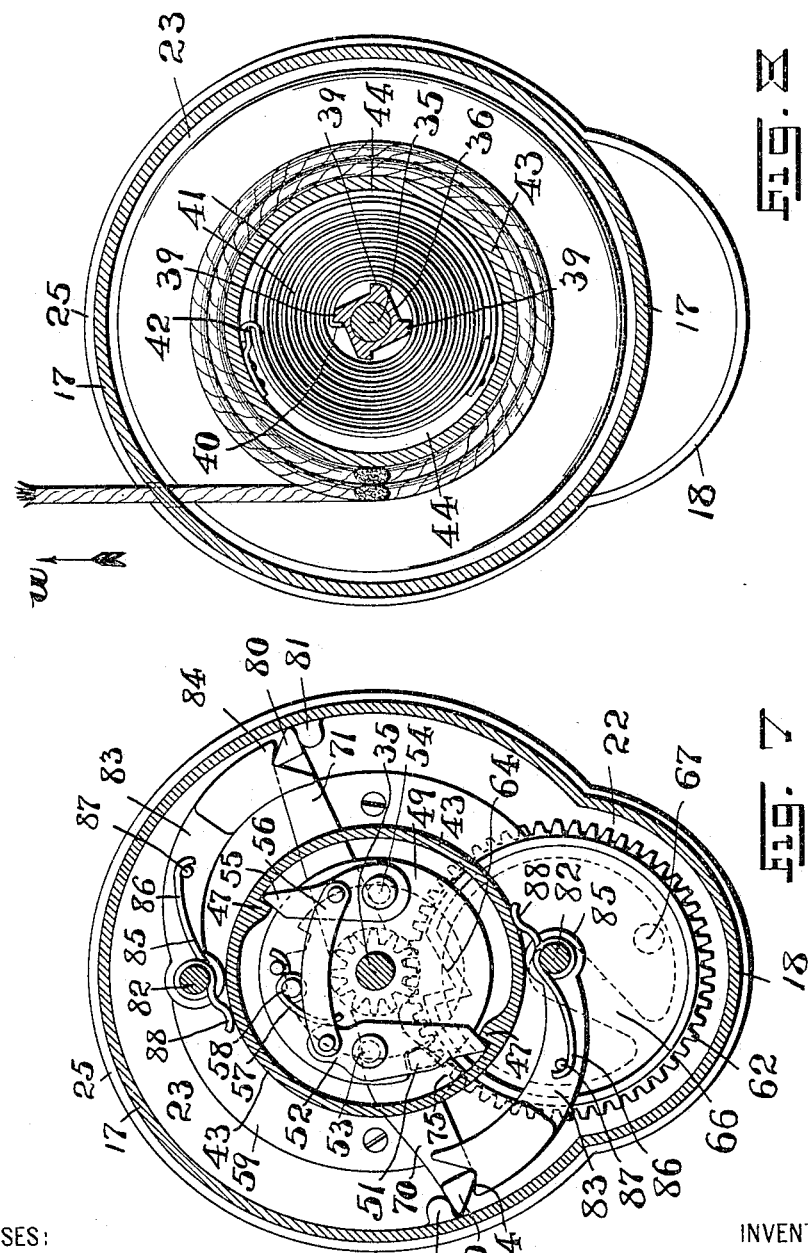

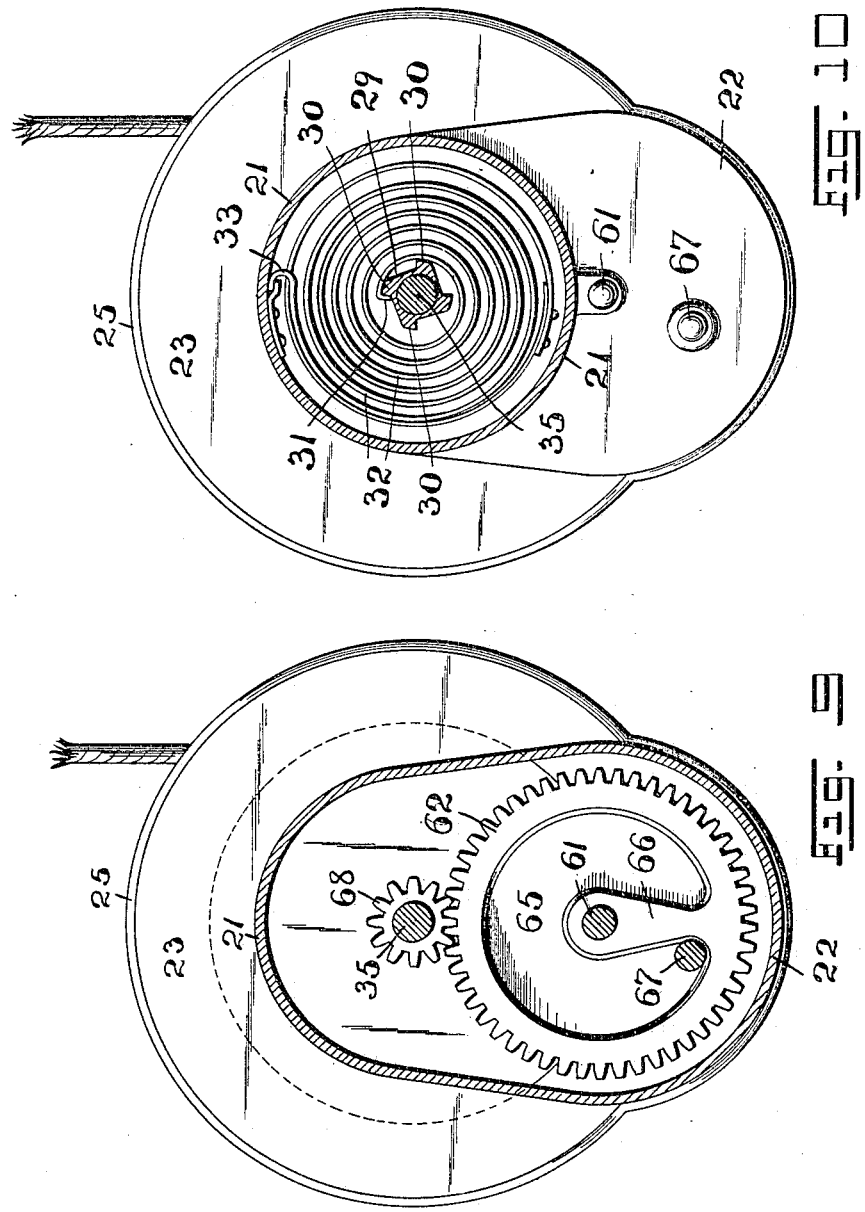

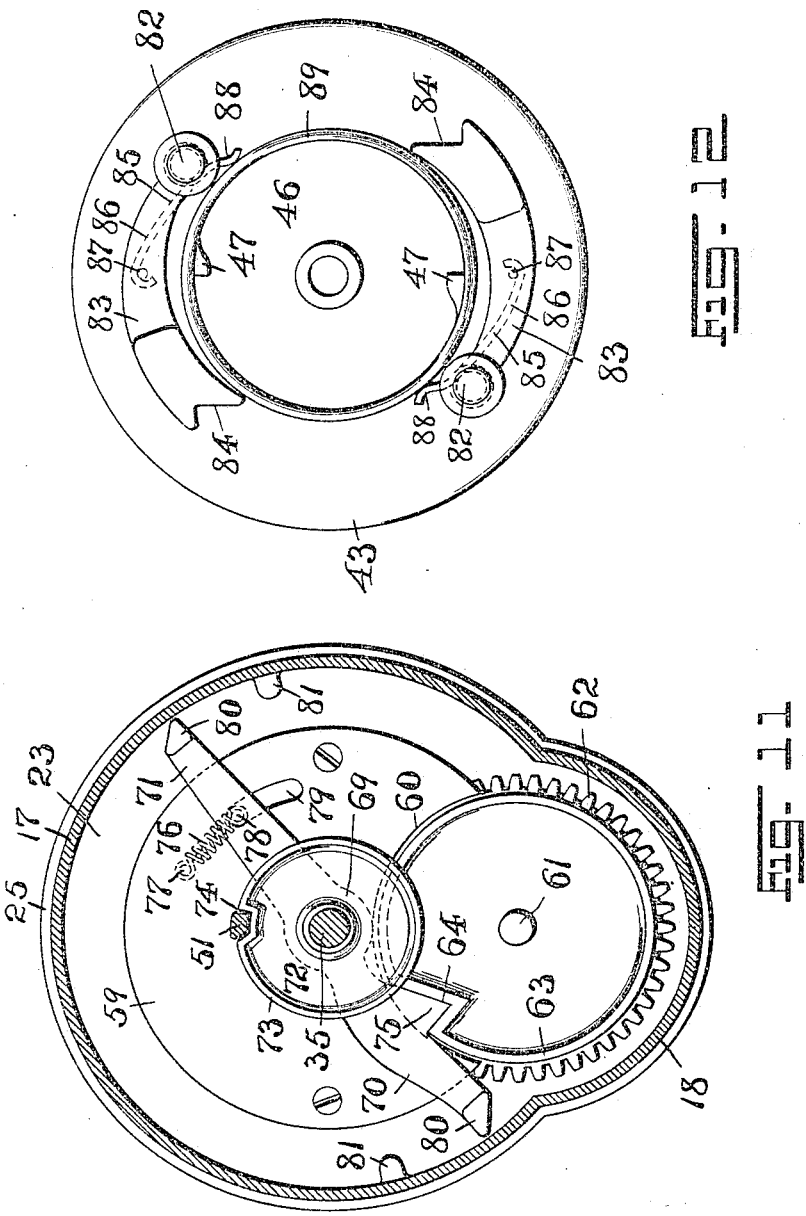

UNITED STATES PATENT OFFICE.

CHARLES E. GIERDING, OF NEWARK, NEW JERSEY.

TROLLEY CATCHER AND RETRIEVER.

SPECIFICATION forming part of Letters Patent No. 787,169, dated April 11, 1905.

Application filed July 7, 1904. Serial No. 215,564.

*To all whom it may concern:*

Be it known that I, CHARLES E. GIERDING, a citizen of the United States, residing at Newark, in the county of Essex and State of New Jersey, have invented certain new and useful Improvements in Trolley Catchers and Retrievers; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to improvements in trolley catchers and retrievers for electric cars which use the overhead trolley; and the invention has for its principal objects to provide a simply-constructed and positively-acting device combining with a reel, drum, or sheave, upon which the trolley-rope can be reeled, mechanism arranged and constructed that the reel, drum, or sheave is permitted to take up any slack of the trolley-rope in all positions of the trolley, and, furthermore, to provide a device which will catch and retrieve the trolley when forced from the trolley-wire, the trolley-rope being reeled upon the reel, drum, or sheave to hold the trolley pole and wheel in a lowered position beneath the wire and in which position the parts of the mechanism are locked or held until the "reeled-in" rope is pulled out to rewind a main or retriever spring, and thereby again bring the parts of the mechanism in their operative positions for again retrieving and holding in a lowered position the trolley in case it is forced off the wire.

A further object of this invention is to provide a device of the character hereinafter more particularly set forth in which the mechanism and parts thereof act automatically and quickly to maintain the proper tension upon the trolley-rope by the use of a "take-up" spring connected with a reel, drum, or sheave, which is loosely arranged upon a shaft, and to catch and hold down the trolley-wheel by means of a stronger or retriever spring when the trolley-wheel leaves the wire.

Other objects of this invention not at this time more particularly specified will be clearly evident from the following detailed description of my invention.

My present invention consists in the novel trolley catcher and retriever, hereinafter more particularly set forth; and, furthermore, this invention consists in the various arrangements and combinations of devices and parts, as well as in the details of the construction of the same, all of which will be fully described in the following specification, and then finally embodied in the clauses of the claim, which are appended to and which form an essential part of this specification.

The invention is clearly illustrated in the accompanying drawings, in which—

Figure 1 is a front view of a trolley catcher and retriever embodying the principles of this invention; and Fig. 2 is a side view of the same, showing in connection therewith and in transverse vertical section a support or holder, by means of which the trolley catcher and retriever is detachably connected with the dash or other part of a car. Fig. 3 is a plan view of the support or holder; and Fig. 4 is a horizontal sectional representation of the said support or holder and a part of the trolley catcher and retriever casing, showing one manner of detachably connecting the said devices. Fig. 5 is a central transverse vertical section of the trolley catcher and retriever. Fig. 6 is a transverse vertical section taken on line 6 6 in said Fig. 5 looking in the direction of the arrow *x* and showing the various parts of the mechanism in their normal initial positions during their inactivity when the trolley is in contact with the wire; and Fig. 7 is a similar view of the same parts, illustrating them in their positions when the main or retriever spring is active. Fig. 8 is a transverse vertical section of the reel or drum and its tension or take-up spring, said section being taken on line 8 8 in said Fig. 5. Fig. 9 is a vertical cross-section taken on line 9 9 in said Fig. 5 looking in the direction of the arrow *y;* and Fig. 10 is a transverse vertical section taken on line 10 10 in said Fig. 5, showing the main or retriever spring in elevation. Fig. 11 is a vertical cross-section taken on line 11 11 in Fig. 5; and Fig. 12 is a face view of the reel, drum, or sheave, and a pair of centrifugal dogs pivotally connected therewith.

Similar characters of reference are employed in the above-described views to indicate corresponding parts.

Referring now to the several figures of the drawings, the reference character 1 indicates the complete trolley catcher and retriever, and 2 is a stationary support or holder which is adapted to be permanently secured to the dash or other part of a car. This support or holder, as will be seen from an inspection of Figs. 2, 3, and 4, consists, essentially, of a main receiving portion or body 3, from which extend suitably-disposed flanges 4, provided with holes or perforations 5 for the reception of bolts or screws, by means of which the said holder can be secured in its position upon the dash or other convenient part of the car; but it will be understood that any other suitable fastening means may be employed, if desired. From an inspection of Figs. 3 and 4 it will be seen that the said main receiving portion or body 3 is made with a pair of outwardly-extending and oppositely-placed holding members 6, each member 6 being made with a holding-flange 7 and an opening 8, whereby a pair of receiving-sockets are provided. One of said sockets is made with an opening 9 in its side, into which extends a nosing or holding portion 11 of a latch-dog 10, which is pivotally arranged upon a pin 12, connected with the holding lugs or ears 13, and is held in its normal initial position (indicated in Figs. 3 and 4) by a spring 14, substantially as shown. The said nosing or holding portion 11 is provided with an inclined surface 15, and the latch-dog is preferably provided with a finger-piece 16, all for the purposes to be presently described.

The trolley catcher and retriever consists, essentially, of a main shell or body 17, having a downwardly-extending portion 18, the said shell or body being closed, as at 19, but having an open part 20 at the back, which is closed by means of another shell or body 21, provided with a downwardly-extending portion 22. The said shell or body 21 is also provided with a flange portion 23, and the said downwardly-extending portion 22 has a marginal flange 24, both of which correspond to the marginal edge of the open part of the shell or body 17 and portion 18, these parts being placed against each other, as clearly indicated in Fig. 5 of the drawings, and then being secured together by means of a ring 25, which has a part brazed or otherwise secured to a portion of the main body or shell 17 and has another part secured, by means of screws 26, upon the marginal flange 24 of the shell or body 21, as illustrated in Figs. 2 and 5; but of course it will be understood that these several parts may be of any other suitable configuration and may be secured together by means of other suitably-constructed fastening devices. The said shell or body 21 is provided upon its outer surface with outwardly-extending lugs or teats, as 27, which can be made to register with the openings 8 in the flanges 7 of the members 6 of the holder 2, whereby the said lugs or teats 27 can be arranged in the receiving-sockets of the holder 2 and by means of a slight turn can be brought directly beneath the flanges 7, one of the said lugs or teats being brought against the inclined face 15 of the nosing or holding portion 11 of the latch-dog 10, which is then caused to drop behind the said lug or teat 27, as clearly illustrated in Fig. 4 of the drawings, to thereby retain the trolley catcher and retriever in position in the main receiving portion or body 3 of the said holder 2, as will be clearly evident. To remove the said trolley catcher and retriever from said receiving portion or body 3 when it is to be connected with another holder at the other end of the car, all that is necessary is to raise the nosing or holding portion 11 from its engagement with the said lug or teat 27 by lifting the spring latch or dog 10 by means of its finger-piece 16, and the said trolley catcher and retriever can then be turned in the opposite direction until its lugs or teats 27 are brought opposite the openings 8 and finally lifted from its supporting engagement with the stationary support or holder 2.

Referring to Fig. 5 of the drawings, it will be seen that the said shell or body 21 is provided with a centrally-arranged and inwardly-extending stud 28, upon which is rotatably arranged a sleeve or hub 29, provided with a number of ratchets or stops 30, with any one of which is in separable holding engagement an inner and preferably hook-shaped holding end 31 of a retriever or main spring 32, said spring having its opposite end suitably secured, by means of a hook end 33 or other suitable holding means, to the inner surface of the said shell or body 21, as clearly indicated in Fig. 10 of the drawings. The said sleeve or hub 29 is also secured, by means of a pin 34 or other fastening means, upon the one end of a main shaft or spindle 35, said shaft or spindle being arranged in another sleeve or hub 36, which is secured to the said spindle or shaft by means of a pin 36' or other fastening means, as clearly illustrated. The said sleeve or hub 36 has an annular flange 37 arranged against the inner face of the part 19 of the casing or shell 17, and said sleeve or hub 36 has its outer end portion rotatively arranged in an opening or bearing 38 in the said part 19 of the casing or shell 17. This sleeve or hub, as will be seen from an inspection of Fig. 8, is also provided with a number of ratchets or stops 29, with any one of which is in separable holding engagement an inner and preferably hook-shaped holding end 40 of a tension or take-up spring 41, the said spring having its opposite end suitably secured, by means of a hook end 42 or other suitable holding means, to the inner annular surface of a chamber 44 of a suitable reel, drum, or sheave 43. The said reel, drum, or sheave is loosely arranged upon the said shaft or spindle 35 by means of its hub forming part of a web 45, the said web forming a dividing-wall between the chamber 44 and a second chamber 46, substantially as shown in Fig. 5 of the drawings. The inner surface of the annular rim of the reel, drum, or sheave 43 is provided with one or more projections or lugs 47, which form suitable stops, substantially as shown and for the purposes to be presently described. Suitably secured upon the said shaft or spindle 35 is a disk 49, which is provided with a notch 50, into which extends in its normal initial position a projection or stud 51, projecting from the side of a holding dog or pawl 52, said dog being pivotally arranged upon a pin or post 53 upon the side of said disk 49. The said disk 49 is provided with a second pin or post 54, upon which is pivoted a second dog or pawl 55, the said dogs or pawls 52 and 55 being connected by means of a link 56. Under normal conditions the two dogs or pawls 52 and 55 and their link 56 are retained in the positions shown in Fig. 6 by a suitable spring 57, which is fastened upon a post 58 upon said disk 49 and has its free end in engagement with a portion of the dog or pawl 52, substantially as shown.

Suitably secured against the inner face of the portion 23 of the shell or body 21 is a plate or disk 59, which is made with a lower arc-shaped open portion 60, substantially as illustrated in Fig. 11 of the drawings. Suitably arranged and secured upon a spindle 61, which extends in an inward direction from the downwardly-extending portion 22, is a suitable gear 62, which is provided upon one of its faces with an annular projection or flange 63, formed with a receiving depression 64, substantially as shown in Fig. 11, said gear being provided upon its other face with a depression or chamber 65 and a radially-arranged or other suitably-shaped projection 66, forming a stop for a pin or stud 67, which is secured in the portion 22 and extends into the said depression or chamber 65, substantially as illustrated in Figs. 5, 6, 7, and 9. The said gear 62 has its gear-teeth in mesh with a pinion 68, secured upon the said shaft or spindle 35, as shown. Loosely arranged upon the said shaft or spindle 35, between the said plate or disk 59 and the disk 49, is a hub 69, formed with a pair of oppositely-extending arms 70 and 71 and with a disk portion 72, having an annular and laterally-extending flange 73, which is provided with a receiving depression 74, in which the projection or stud 51, which extends from the side of the dog or pawl 52, is normally arranged. Referring now more particularly to Fig. 11 of the drawings, it will be seen that the said arm 70 is made with a holding tooth or projection 75, which normally registers with the receiving depression 64 in the annular projection or flange 63 of the gear 62, the parts being held in these engaged positions by the action of a spring 76, which is secured at one end to a pin 77 upon the back of the plate or disk 59 and secured at its other end to a pin 78, which extends from the side of the arm 71 and through a slot or opening 79 in said plate or disk 59, as clearly illustrated in the drawings. Each arm 70 and 71 is provided at or near its free end with an engaging projection 80 for engagement with suitably-disposed lugs or stops 81 upon the inner surface of the shell or body 17, substantially as and for the purposes hereinafter more particularly described.

As will be seen from an inspection of the several figures of the drawings, the reel, drum, or sheave 43 is provided upon one of its side faces with a pair of laterally-extending pins or pivots 82, on each of which is pivoted a centrifugal holding dog or pawl 83, each dog or pawl having a bifurcated or other suitably-shaped end portion 84, which at certain times engage with the projections 80 of the arms 70 and 71 in the manner represented in Fig. 7 of the drawings. Springs 85, having coiled portions arranged about said pins or pivots 82 and having one end, 86, in engagement with a pin 87 upon the dog or pawl and another end, 88, in engagement with a flange 89 or other suitable portion of the reel, drum, or sheave, are employed to normally hold the said centrifugal holding dogs or pawls 83 in their inoperative positions. (Indicated in Figs. 6 and 12 of the drawings.)

Having thus described the general arrangement and construction of the devices and parts, I will now briefly set forth their operations.

Under normal conditions the parts are in the positions represented in Figs. 5, 6, 8, 11, and 12 of the drawings, and the reel, drum, or sheave 43, to which the trolley-rope is attached, being loose upon the shaft or spindle 35 the spring 45, connected with said reel, drum, or sheave, will tend to maintain a taut trolley-rope without displacing the trolley from the wire, the spring acting to wind up the slack rope and also playing it out according to the variations in the trolley-wire. When, however, the trolley jumps or flies from the wire, the sudden upward and forcible movement of the trolley pole and wheel will tend to produce an unreeling movement of the said reel, drum, or sheave in the direction of the arrow $a$ in both of said Figs. 6 and 8 against the normal rewinding tendency of the spring 45, or, in other words, during such unreeling movement winding up the said spring 45. This sudden unwinding motion of the reel, drum, or sheave 43 will cause the two centrifugal dogs 83 to fly outwardly from their normal initial positions (indicated in Figs. 6 and 12) to the positions represented in Fig. 7 of the drawings, the forked end portions 84 moving in the path of the end portions 80 of the arms 70 and 71 until brought in engagement with said end projections 80 and causing a movement of the said arms 70 and 71 against the stops 81, as shown. This movement results in the disengagement of the tooth or projection 75 of the arm 70 from its holding engagement with the depression 64 in the flange 63 of the gear 62, which having been held in locked relation with the pinion 68 on the shaft or spindle 35 now sets the strong main or retriever spring 32 in action, and thereby actuates the said shaft or spindle 35. Simultaneous with the disengagement of the tooth or projection 75 from its holding engagement with the gear 62 the movements of the arms 70 and 71 produce a rotary motion of the disk portion 72 in the opposite direction, whereby the stud or projection 51, which extends from the side of the dog or pawl 52, will be lifted from the receiving depression 74 and caused to rest upon the flange 73, as indicated in Fig. 7 of the drawings. This action causes the two holding dogs or pawls 52 and 55 to be spread apart, whereby their free end portions are brought in the path of movement of the projections or stops 47 of the reel, drum, or sheave 43, thereby positively connecting the said reel, drum, or sheave with the shaft or spindle 35 and causing the said reel, drum, or sheave to revolve with the said shaft or spindle. Thus it will be evident that the outward movement of the trolley-pole and its trolley are not merely arrested, but in rewinding the trolley-rope upon the reel, drum, or sheave in the direction of the arrow $u'$ the trolley is retrieved and held at a point below the trolley-wire. During such rotary motion of the reel, drum, or sheave in the direction of the said arrow $u'$ the forked ends 84 of the two centrifugal dogs or pawls 83 become disengaged from the extensions 80 of the arms 70 and 71.

It is the purpose of the previously-mentioned pin or stud 67 to hold the trolley at a desired point below the wire by being brought in contact with the opposite edge of the projection 66 from that shown in Fig. 9 to arrest the movements of all the parts of the mechanisms comprising the trolley catcher and retriever.

The gear 62 is of such size that one revolution of said gear will produce about four revolutions of the reel, drum, or sheave, which gives the retriever-spring 32 sufficient opportunity to perform its work; but of course it will be understood that these proportions may be varied.

To return the parts of the device to their normal initial positions, all that is necessary is to pull out the trolley-rope in the direction of the arrow $u$ in said Fig. 8 until the trolley is replaced upon the trolley-wire, thereby rewinding the spring 32, and when the stud 67 has again been brought in the position against the projection 66 (indicated in Fig. 9 of the drawings) then the tooth or projection 75 of the arm 70 has again dropped into the receiving depression 64 of the gear 62 by reason of the action of the spring 76, whereby the gear 62, the pinion 68, and the retriever-spring 32 are once more locked in their normally inoperative positions. At the same time the stud or projection 51, connected with the dog or pawl 52, has again passed into the receiving depression 74 in the flange 73 of the disk 72, whereby the spring 57 and the link 56 again force the two dogs or pawls 52 and 55 into their normally inoperative positions, (represented in Fig. 6,) and the device is now once more in condition to act in the manner previously described to take up any slack in the trolley-rope and also to catch and retrieve the trolley in case of its displacement from the trolley-wire. Of course I am aware that changes may be made in the arrangements and combinations of the devices and their parts, as well as in the details of the construction of the same, without departing from the scope of my present invention. Hence I do not limit my invention to the exact arrangements and combinations of the devices and parts as described in the foregoing specification and as illustrated in the accompanying drawings, nor do I confine myself to the exact details of the construction of the said parts.

Having thus described my invention, what I claim is—

1. In a trolley catcher and retriever, the combination, with a casing, of a shaft rotatably arranged in said casing, a reel arranged to normally rotate loosely upon said shaft, a shaft-actuating means connected with said shaft, a spring-controlled mechanism loosely arranged upon said shaft for locking said reel upon said shaft that it will turn with the shaft, and means for actuating and controlling the movements of said spring-controlled mechanism, substantially as and for the purposes set forth.

2. In a trolley catcher and retriever, the combination, with a casing, of a shaft rotatably arranged in said casing, a reel arranged to normally rotate loosely on said shaft, a shaft-actuating means connected with said shaft for rotating the same, a normally locked spring-controlled mechanism loosely arranged on said shaft for locking said reel upon said shaft that it will turn with the shaft, means for releasing said shaft-rotating means from active engagement with said spring-controlled mechanism, and means connected with said reel for releasing said spring-controlled mechanism, substantially as and for the purposes set forth.

3. In a trolley catcher and retriever, the combination, with a casing, of a shaft rotatably arranged in said casing, a reel arranged to normally rotate loosely on said shaft, a shaft-actuating means connected with said shaft for rotating the same, a normally locked spring-controlled mechanism loosely arranged on said shaft for locking said reel upon said shaft that it will turn with the shaft, means for releasing said shaft-rotating means for active engagement with said spring-controlled mechanism, and a centrifugal engaging dog operated by the motion of said reel for releasing the said spring-controlled mechanism, substantially as and for the purposes set forth.

4. In a trolley catcher and retriever, the combination, with a casing, of a shaft rotatively arranged in said casing, a reel arranged to normally rotate loosely upon said shaft, a tension or take-up spring between the said reel and shaft, a shaft-actuating mechanism connected with said shaft for rotating said shaft, a normally wound retriever-spring connected with said shaft for actuating said shaft-actuating mechanism, and means connected with said reel for releasing said retriever-spring, substantially as and for the purposes set forth.

5. In a trolley catcher and retriever, the combination, with a casing, of a shaft rotatably arranged in said casing, a reel arranged to normally rotate loosely upon said shaft, a tension or take-up spring between said reel and said shaft, a shaft-actuating mechanism connected with said shaft for rotating said shaft, a normally wound retriever-spring connected with said shaft for actuating said shaft-actuating mechanism, a retriever-spring-holding means also arranged on said shaft, and means connected with said reel for releasing said retriever-spring-holding means, substantially as and for the purposes set forth.

6. In a trolley catcher and retriever, the combination, with a casing, of a shaft rotatably arranged in said casing, a reel arranged to normally rotate loosely upon said shaft, a tension or take-up spring between said reel and shaft, a shaft-actuating mechanism connected with said shaft for rotating said shaft, a normally wound retriever-spring connected with said shaft, for actuating said shaft-actuating mechanism, means for holding said retriever-spring in its wound relation, and a centrifugal engaging dog operated by the motion of said reel and arranged to actuate the said retriever-spring-holding means, substantially as and for the purposes set forth.

7. In a trolley catcher and retriever, the combination, with a casing, of a shaft rotatably arranged in said casing, a reel arranged to rotate loosely upon said shaft, a normally locked shaft-rotating mechanism, a disk loosely arranged upon said shaft, arms extending from said disk, one of said arms having a portion in holding engagement with the said shaft-rotating mechanism, and means connected with said reel arranged to engage said disk-arms and thereby release said shaft-rotating mechanism, substantially as and for the purposes set forth.

8. In a trolley catcher and retriever, the combination, with a casing, of a shaft rotatably arranged in said casing, a reel arranged to rotate loosely upon said shaft, a normally locked shaft-rotating mechanism, a disk loosely arranged upon said shaft, arms extending from said disk, one of said arms having a portion in holding engagement with said shaft-rotating mechanism, and a pair of centrifugal engaging dogs operated by the motion of said reel and arranged to engage said disk-arms to thereby release said shaft-rotating mechanism, substantially as and for the purposes set forth.

9. In a trolley catcher and retriever, the combination, with a casing, of a shaft rotatably arranged in said casing, a reel arranged to rotate loosely upon said shaft, a normally wound retriever-spring connected with said shaft, and means for holding said retriever-spring in its wound relation, comprising a disk loosely arranged upon said shaft, arms extending from said disk, one of said arms having a projection, and a gear having a receiving depression with which said projection is in holding engagement, and means connected with said reel arranged to engage said disk-arms and thereby release said projection from the receiving depression of said gear, substantially as and for the purposes set forth.

10. In a trolley catcher and retriever, the combination, with a casing, of a shaft rotatably arranged in said casing, a reel arranged to rotate loosely upon said shaft, a normally wound retriever-spring connected with said shaft, and means for holding said retriever-spring in its wound relation, comprising a disk loosely arranged upon said shaft, arms extending from said disk, one of said arms having a projection, and a gear having a receiving depression with which said projection is in holding engagement, and a pair of centrifugal engaging dogs operated by the motion of said reel and arranged to engage said disk-arms and thereby release said projection from the receiving depression of said gear, substantially as and for the purposes set forth.

11. In a trolley catcher and retriever, the combination, with a casing, of a shaft rotatably arranged in said casing, a reel arranged to rotate loosely upon said shaft, a shaft-operating mechanism, comprising a pinion on said shaft, a gear in mesh with said pinion, said gear being provided with a receiving depression, a disk loosely arranged upon said shaft, arms extending from said disk, a holding-tooth on one of said arms normally in holding engagement with the receiving depression of said gear, and means connected with said reel arranged to engage said disk-arms and thereby release said holding-tooth from said receiving depression of said gear, substantially as and for the purposes set forth.

12. In a trolley catcher and retriever, the combination, with a casing, of a shaft rotatably arranged in said casing, a reel arranged to loosely rotate upon said shaft, a shaft-operating mechanism, comprising a pinion on said shaft, a gear in mesh with said pinion, said gear being provided with a receiving depression, a disk loosely arranged upon said shaft, arms extending from said disk, a holding-tooth on one of said arms normally in holding engagement with the receiving depression of said gear, and a pair of centrifugal engaging dogs operated by the motion of said reel and arranged to engage said disk-arms to thereby release said holding-tooth from said receiving depression of said gear, substantially as and for the purposes set forth.

13. In a trolley catcher and retriever, the combination, with a casing, of a shaft rotatably arranged in said casing, a reel arranged to rotate loosely upon said shaft, a normally wound retriever-spring connected with said shaft, means for holding said retriever-spring in its wound relation, comprising a pinion on said shaft, a gear in mesh with said pinion, said gear being provided with a receiving depression, a disk loosely arranged upon said shaft, arms extending from said disk, a holding-tooth on one of said arms normally in holding engagement with the receiving depression of said gear, and means connected with said reel arranged to engage said disk-arms and thereby release said holding-tooth from said receiving depression of said gear, substantially as and for the purposes set forth.

14. In a trolley catcher and retriever, the combination, with a casing, of a shaft rotatably arranged in said casing, a reel arranged to rotate loosely upon said shaft, a normally wound retriever-spring connected with said shaft, means for holding said retriever-spring in its wound relation, comprising a pinion on said shaft, a gear in mesh with said pinion, said gear being provided with a receiving depression, a disk loosely arranged upon said shaft, arms extending from said disk, a holding-tooth on one of said arms normally in holding engagement with the receiving depression of said gear, and a pair of centrifugal engaging dogs operated by the motion of said reel and arranged to engage said disk-arms to thereby release said holding-tooth from said receiving depression of said gear, substantially as and for the purposes set forth.

15. In a trolley catcher and retriever, the combination, with a casing, of a shaft and pinion, a reel and a retriever-spring, a gear in mesh with said pinion, said gear being provided with a receiving depression, and a holding projection adapted to be brought in separable engagement with said receiving depression, substantially as and for the purposes set forth.

16. In a trolley catcher and retriever, the combination, with a casing, of a shaft and pinion, a reel and a retriever-spring, a gear in mesh with said pinion, said gear being provided with a receiving depression, and a holding projection adapted to be brought in separable engagement with said receiving depression, and means in engagement with another portion of said gear for permitting but a partial rotary motion of the gear, substantially as and for the purposes set forth.

17. In a trolley catcher and retriever, the combination, with a casing, of a shaft and pinion, a reel and a retriever-spring, a gear in mesh with said pinion, said gear being provided with a chambered portion and an enlargement forming a stop, and a stud connected with said casing and extending into said chambered portion of the gear, substantially as and for the purposes set forth.

18. In a trolley catcher and retriever, the combination, with a casing, of a shaft and pinion, a reel and a retriever-spring, a gear in mesh with said pinion, said gear being provided with an annular flange having a receiving depression, and a holding mechanism provided with a projection in holding engagement with the receiving depression of said gear, substantially as and for the purposes set forth.

19. In a trolley catcher and retriever, the combination, with a casing, of a shaft and pinion, a reel and a retriever-spring, a gear in mesh with said pinion, means for permitting but a partial rotary motion of said gear, and a holding mechanism in holding engagement with said gear, substantially as and for the purposes set forth.

20. In a trolley catcher and retriever, the combination, with a casing, of a shaft and pinion, a reel and a retriever-spring, a gear in mesh with said pinion, said gear being provided with a chambered portion and an enlargement forming a stop, a stud connected with a portion of said casing and extending into said chambered portion of the gear, and a holding mechanism in holding engagement with said gear, substantially as and for the purposes set forth.

21. In a trolley catcher and retriever, the combination, with a casing, of a shaft, a reel arranged to rotate loosely upon said shaft, and means for operatively connecting said reel to said shaft, comprising a chambered portion of said reel having an engaging lug, a dog pivotally arranged in said chamber of the reel, and means for causing said holding-dog to engage said holding-lug, substantially as and for the purposes set forth.

22. In a trolley catcher and retriever, the combination, with a casing, of a shaft, a reel arranged to rotate loosely upon said shaft, said reel being provided with a chambered part having a holding-lug, a disk secured upon said shaft, a dog pivotally connected with said disk, and means for causing said holding-dog to engage said holding-lug, substantially as and for the purposes set forth.

23. In a trolley catcher and retriever, the combination, with a casing, of a shaft, a reel arranged to rotate loosely upon said shaft, said reel being provided with a chambered part having a holding-lug, a disk secured upon said shaft, a dog pivotally connected with said disk, a finger extending from said dog, means for causing said holding-dog to engage said holding-lug, consisting of a second disk provided with a receiving depression in which said finger is normally at rest, and means for producing a movement of said second disk whereby said finger is removed from said receiving depression and the holding-dog is raised, substantially as and for the purposes set forth.

24. In a trolley catcher and retriever, the combination with a casing, of a shaft, a reel on said shaft, and a holding-dog disk on said shaft, within and independent from said casing, substantially as and for the purposes set forth.

25. In a trolley catcher and retriever, a shaft, a reel on said shaft, a holding-dog disk on said shaft, holding-dogs on said disk, a second disk on said shaft provided with means for raising said holding-dogs, outwardly-extending arms on said second disk, and centrifugal dogs on said reel for engagement with said disk-arms, substantially as and for the purposes set forth.

26. In a trolley catcher and retriever, a shaft, a pinion on said shaft, and a gear in mesh with said pinion having a laterally-extending flange provided with a receiving depression, substantially as and for the purposes set forth.

27. In a trolley catcher and retriever, a shaft, a pinion on said shaft, and a gear in mesh with said pinion having a laterally-extending flange provided with a receiving depression, combined with an arm 70, and a holding-tooth on said arm resting in said receiving depression, substantially as and for the purposes set forth.

28. In a trolley catcher and retriever, the combination with a casing, of a reel, a holding-dog disk within and independent from said casing, and centrifugal engaging dogs on said reel, substantially as and for the purposes set forth.

29. In a trolley catcher and retriever, the combination with a casing, of a reel, a holding-dog disk within and independent from said casing, pivotal posts extending from the side of said reel, and a spring-controlled centrifugal dog on each post, substantially as and for the purposes set forth.

30. In a trolley catcher and retriever, a disk provided with a radially-extending arm, said disk being made with a laterally-extending flange having a receiving depression, a holding-dog having a lifting portion normally resting in said depression, a gear also provided with a laterally-extending flange having a receiving depression, and a holding-tooth on said disk-arm normally in holding engagement with the receiving depression of said gear, substantially as and for the purposes set forth.

31. The combination, with a support adapted to be secured to a car, said support comprising a casing having lug-receiving portions, and a pivoted latch having a holding end extending into one of said lug-receiving portions, of a trolley catcher and retriever comprising a casing, and holding-lugs on said casing extending into said lug-receiving portions of the support, one of said lugs being in separable holding engagement with the holding portion of said latch, substantially as and for the purposes set forth.

32. The combination, with a support adapted to be secured to a car, said support comprising a casing having lug-receiving portions, and a spring-controlled and pivoted latch having a holding end extending into one of said lug-receiving portions, and a finger-piece on said latch, of a trolley catcher and retriever comprising a casing, and holding-lugs on said casing extending into said lug-receiving portions of the support, one of said lugs being in separable holding engagement with the holding portion of said latch, substantially as and for the purposes set forth.

In testimony that I claim the invention set forth above I have hereunto set my hand this 5th day of July, 1904.

CHARLES E. GIERDING.

Witnesses:
FREDK. C. FRAENTZEL,
GEO. D. RICHARDS.